US008473903B2

(12) United States Patent
Tsuta

(10) Patent No.: US 8,473,903 B2
(45) Date of Patent: Jun. 25, 2013

(54) CODE EDIT APPARATUS AND RECORDING MEDIUM

(75) Inventor: Seigo Tsuta, Machida (JP)

(73) Assignee: The Bank of Tokyo-Mitsubishi UFJ, Ltd., Tokyo (JP)

( * ) Notice: Subject to any disclaimer, the term of this patent is extended or adjusted under 35 U.S.C. 154(b) by 351 days.

(21) Appl. No.: 12/892,057

(22) Filed: Sep. 28, 2010

(65) Prior Publication Data

US 2011/0078656 A1    Mar. 31, 2011

(30) Foreign Application Priority Data

Sep. 28, 2009 (JP) ................................. 2009-222635

(51) Int. Cl.
*G06F 9/44* (2006.01)

(52) U.S. Cl.
USPC .......................................................... 717/110

(58) Field of Classification Search
None
See application file for complete search history.

(56) References Cited

U.S. PATENT DOCUMENTS

| 6,185,591 | B1 * | 2/2001 | Baker et al. | 715/210 |
|---|---|---|---|---|
| 6,243,859 | B1 * | 6/2001 | Chen-Kuang | 717/111 |
| 7,322,013 | B1 * | 1/2008 | Benson et al. | 715/837 |
| 2004/0019879 | A1 * | 1/2004 | Segawa et al. | 717/124 |
| 2008/0141224 | A1 | 6/2008 | Kawasaki et al. | |

FOREIGN PATENT DOCUMENTS

| EP | 0 699 996 | 3/1996 |
|---|---|---|
| JP | 63-010239 | 1/1988 |
| JP | 06-242943 | 9/1994 |
| JP | 06-314194 | 11/1994 |
| JP | 07-110780 | 4/1995 |
| JP | 08-179940 | 7/1996 |
| JP | 2003-036171 | 2/2003 |
| JP | 2004-258728 | 9/2004 |
| JP | 2004-287869 | 10/2004 |
| JP | 2008-140162 | 6/2008 |
| JP | 2008-217721 | 9/2008 |

OTHER PUBLICATIONS

Notice of Reasons for Rejection for corresponding Japanese Patent Application 2009-222635 mailed Jun. 28, 2011.
Report on prior art search with English Translation dated Jul. 27, 2009.

* cited by examiner

*Primary Examiner* — Philip Wang
(74) *Attorney, Agent, or Firm* — Banner & Witcoff, Ltd.

(57) ABSTRACT

Each of first programs stored in a recording medium causes a computer to execute each specific type of edit process. A second program stored in the recording medium causes the computer to execute the following steps. A first step is a step of acquiring first information for designating a program file and an area to be edited and second information for designating the first program. A second step is a step of causing the computer to execute the process of editing the binary code of the area designated by the first information via the first program designated by the second information.

14 Claims, 8 Drawing Sheets

FIG.3A

| LABEL | EXPLANATION |
|---|---|
| #weaver: | DESIGNATE WEAVER (BeforeAfterWeaver HERE) |
| #var: | DEFINE LOCAL VARIABLE TO BE NEWLY USED (ARBITRARY) |
| #code:1 | DESCRIBE CODE TO BE INSERTED AT THE TOP OF METHOD |
| #code:2 | DESCRIBE CODE TO BE INSERTED AT THE BOTTOM OF METHOD |

EXAMPLE

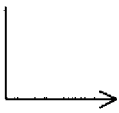

```
weaver:OOO.BeforeAfterWeaver var:
long now;

#code:1
long now = System.nanoTime();

#code:2
System.out.println("time:"+(System.nanoTime()-now));
```

[performance_log.jwr]

FIG.3B

| LABEL | EXPLANATION |
|---|---|
| #weaver: | DESIGNATE WEAVER (AddCatchWeaver HERE) |
| #var: | DEFINE LOCAL VARIABLE TO BE NEWLY USED (ARBITRARY) |
| #code:1 | DESCRIBE CODE TO BE INSERTED TO CATCH BLOCK |
| #exception: | DESIGNATE EXCEPTION TYPE TO BE CAUGHT |

FIG.3C

| LABEL | EXPLANATION |
|---|---|
| #weaver: | DESIGNATE WEAVER (ReplaceMethodWeaver HERE) |
| #code:1 | DEFINE INSTALLATION OF NEW METHOD |

FIG.4A

```
package △△△;

public class Targetx{
  public static void sayHello(){
    System.out.println("Hello");
  }
}
```

FOR EXAMPLE, THE FOLLOWING Plan FILE IS CREATED TO WEAVE THE Targetx CLASS sayHello METHOD USING BeforeAfterWeaver AND USING Rule FILE (performance_log.jwr) FOR INSERTING BYTE CODE FOR OUTPUTTING EXECUTION TIME TO METHOD TO BE EDITED.

△△△.Targetx#sayHello()=performance_log.jwr /130

Plan FILE NAME, NAME OF ARCHIVE FILE STORING CLASS FILE TO BE EDITED, AND DESTINATION OF ARCHIVE FILE AFTER BYTE CODE EDIT ARE SET AS ARGUMENTS FROM CONSOLE TO EXECUTE Jweaver

```
$>java JWeaver [Plan FILE NAME] [NAME OF ARCHIVE FILE STORING CLASS FILE TO BE EDITED] [DESTINATION OF ARCHIVE FILE AFTER BYTE CODE EDIT]
```

EXAMPLE OF USING Plan FILE "myplan.jwp" TO EDIT ARCHIVE FILE Targetx_Archive.ear AND OUTPUTTING EDITED ARCHIVE FILE TO dist FOLDER IN THE SAME FILE NAME

```
$>java JWeaver myplan.jwp Targetx_Archive.ear dist/Targetx_Archive.ear
```

FIG.4B

OUTPUT Targetx CLASS BEFORE WEAVING

```
Hello
```

OUTPUT Targetx CLASS AFTER WEAVING

```
Hello
time:706235
```

CODE EDIT APPARATUS AND RECORDING MEDIUM

CROSS-REFERENCE TO RELATED APPLICATION

This application claims the benefit of priority of Japanese Patent Application No. 2009-222635 filed to Japanese Patent Office on Sep. 28, 2009, the disclosure of which is incorporated herein by reference.

BACKGROUND

The present invention relates to a code edit apparatus and a recording medium recording a program causing a computer to function as the code edit apparatus.

An example of a conventionally known software debugging includes an operation of editing a source code, such as adding a debug code to the source code, and then compiling the edited source code to generate a binary code embedded with the debug code.

An example of a known debugging tool includes a tool for embedding a break code to a binary code of software in accordance with an instruction from the user and setting a breakpoint to the binary code. In the tool, for example, a source code corresponding to the binary code is referenced, and the break code is embedded to a location designated by the user.

SUMMARY

It is conventionally known that the use of such a debugging tool allows editing the binary code without editing the source code by the user in the edit operation of the binary code associated with the software debugging.

However, only a limited edit operation of binary code is possible in the conventional debugging tool, and a satisfactory debug operation may not be performed only by the use of such a conventional debugging tool.

Therefore, in one aspect of the present invention, it is preferable that a binary code can be edited with a higher degree of freedom than in the past without the edit by the user of a source code corresponding to the binary code to be edited.

A recording medium according to an aspect of the present invention records first programs and a second program described below as code edit programs.

Each of the first programs is a program causing a computer to execute a step of performing a specific type of edit process to a binary code to be edited. The first program is recorded in the recording medium for each type of edit process. In the present specification, compiled data of source code such as a native code or a byte code or the like will be expressed as a "binary code".

Meanwhile, the second program is a program causing the computer to execute a file acquisition step, a code acquisition step, an edit control step, and an edited file output step described below.

The file acquisition step is a step of acquiring a single file describing "first designation information that is information for designating a program file including the binary code to be edited and an edit target area in the program file" and "second designation information that is information for designating the first program to be used" or acquiring a file group in which the designation information is dispersed and described.

The code acquisition step is a step of acquiring the binary code of the program file designated by the first designation information described in the single file or the file group acquired in the file acquisition step.

The edit control step is a step of causing the computer to execute the specific type of edit process based on the first program designated by the second designation information described in the single file or the file group acquired in the file acquisition step, a binary code in the edit target area designated by the first designation information of the binary code acquired in the code acquisition step being the binary code to be edited.

The edited file output step is a step of outputting a program file storing the binary code edited in the edit control step as an edited program file corresponding to the program file designated by the first designation information.

As described, in the present invention, the first program capable of applying a specific type of edit to a binary code is recorded in the recording medium for each type of edit process. Therefore, the user can edit the binary code to be edited with a high degree of freedom by selecting a first program to be used for the edit, writing the designation information in a data file as the second designation information, and causing a computer to execute a process based on the program recorded in the recording medium of the present invention. According to the present invention, the binary code to be edited can be directly edited through the first program. Therefore, the user can edit the binary code to be edited without acquiring a source code corresponding to the binary code to be edited.

An example of the first program includes a program causing the computer to execute a process of adding a new binary code to the binary code to be edited.

Other examples of the first program include a program causing the computer to execute a process of replacing at least part of the binary code to be edited by another binary code and a program causing the computer to execute a process of deleting at least part of the binary code to be edited from the binary code acquired in the code acquisition step.

The binary code to be edited can be edited with a high degree of freedom if at least one, or preferably, two or more programs listed here are provided to the user as the first program via the recording medium.

The recording medium may record, as the first program and for each type of edit process, a program causing a computer to execute a step of performing a specific type of edit process according to a set value of an operation parameter to a binary code to be edited".

In this case, the recording medium may record, as the second program, a program causing a computer to execute a file acquisition step, a code acquisition step, an edit control step, and an edited file output step described below.

The file acquisition step is a step of acquiring a single file describing "first designation information that is information for designating a program file including the binary code to be edited and an edit target area in the program file", "second designation information that is information for designating the first program to be used", and "third designation information indicating the set value of the operation parameter for the first program" or acquiring a file group in which the designation information is dispersed and described.

The code acquisition step is a step of acquiring the binary code of the program file designated by the first designation information described in the single file or the file group acquired in the file acquisition step.

The edit control step is a step of causing the computer to execute the specific type of edit process that is based on the first program designated by the second designation information and that is in accordance with the set value of the operation parameter indicated by the third designation information in accordance with the first designation information, the second designation information, and the third designation information described in the single file or the file group acquired in the file acquisition step, a binary code in the edit target area indicated by the first designation information of the binary code acquired in the code acquisition step being the binary code to be edited.

The edited file output step is a step of outputting a program file storing the binary code edited in the edit control step as an edited program file corresponding to the program file designated by the first designation information.

According to the configurations of the first program and the second program, details of the edit can be determined by the operation parameter.

Therefore, the user can edit the binary code to be edited with a high degree of freedom by selecting the first program and the operation parameter to be used and writing the designation information in the data file as the second designation information and the third designation information. According to the present invention, the binary code to be edited can be directly edited via the first program. Therefore, the user can edit a binary code without editing a source code, with a higher degree of freedom than in the past.

The second program may be configured to be able to set, to the first program and as the operation parameter, a number for designating a binary code added to the binary code to be edited. The second program may also be configured to be able to set, to the first program and as the operation parameter, a source code (hereinafter, also called "additional code") corresponding to the binary code added to the binary code to be edited.

The second program may also be configured to be able to set, to the first program and as the operation parameter, a source code (hereinafter, also called "replacement code") corresponding to a binary code replaced from an original binary code in at least a partial area of the binary code to be edited.

In this case, the recording medium may record, as the first program, a program causing the computer to execute a process of translating a source code (additional code) indicated by the set value of the operation parameter into a binary code and adding the binary code to the binary code to be edited and a program causing the computer to execute a process of translating the source code (replacement code) indicated by the set value of the operation parameter into a binary code and replacing at least part of the binary code to be edited by the converted binary code.

According to the configurations of the first program and the second program, the user can add an arbitrary binary code to the binary code to be edited just by creating a data file that describes the source code corresponding to the binary code for addition or replacement as the third designation information.

More specifically, according to the configurations of the first program and the second program, the user can add an arbitrary binary code to the binary code to be edited without editing and recompiling the source code corresponding to the binary code to be edited, and the convenience of the edit operation of the binary code can be improved.

The file acquisition step can be a step including: a step of acquiring a target description file, which is a data file describing, along with the first designation information, designation information of "an edit rule description file that is a data file describing the second designation information and the third designation information" as an information designating an edit rule description file to be used (acquired); and after the acquisition of the target description file, a step of acquiring the edit rule description file designated by the target description file.

In this way, a general-purpose edit rule description file can be created by separating the data file describing the first designation information and the data file describing the second designation information and the third designation information. Therefore, the edit rule description file does not have to be created every time the edit target is changed, and the convenience improves.

For example, if the designer of the code edit programs creates a general-purpose edit rule description file in advance and the general-purpose edit rule description file is provided to the user via a recording medium, etc., the user can use the first program and the second program recorded in the recording medium of the present invention to edit the binary code just by creating a target description file describing the first designation information and the designation information of the edit rule description file to be used, without creating an edit rule description file.

Preferably, the recording medium records, as the first program, a program (before/after addition program) causing the computer to execute "a process of adding the binary code causing the computer to perform, to the binary code to be edited, a process corresponding to the source code indicated by the set value of the operation parameter before and after executing the series of processes based on the binary code to be edited".

Preferably, the recording medium records an edit rule description file describing a second designation information for designating the before/after addition program, and describing, as the third designation information, a source code causing the computer to execute processes that measure the execution time of a series of processes based on the binary code to be edited before and after executing the series of processes based on the binary code to be edited.

To measure the execution time of a specific function or a method, the user can use the recording medium to add a debug code for measuring the execution time to the binary code to be edited just by creating the target description file for designating the edit rule description file stored in the recording medium, without creating an edit rule description file. Therefore, according to the recording medium, the convenience of the debugging improves.

The concept can be applied to a code edit apparatus.

For example, the code edit apparatus includes, for each type of edit process, a code edit device corresponding to functions realized by the first program and further includes a file acquisition device, a code acquisition device, an edit control device, and an edited file output device corresponding to functions realized by the second program.

The code edit device included in the code edit apparatus is a device that applies a specific type of edit process to a binary code to be edited.

The file acquisition device is a device that acquires a single file describing first designation information, which is information for designating a program file including the binary code to be edited and an edit target area in the program file, and second designation information, which is information for designating the code edit device to be activated, or that acquires a file group in which the designation information is dispersed and described.

The code acquisition device is a device that acquires the binary code of the program file designated by the first designation information described in the single file or the file group acquired in the file acquisition device.

The edit control device is a device that activates the code edit device designated by the second designation information described in the single file or the file group acquired by the file acquisition device and that causes the code edit device to execute the specific type of edit process, a binary code in the edit target area indicated by the first designation information of the binary code acquired by the code acquisition device being the binary code to be edited.

The edited file output device is a device that outputs a program file storing the edited binary code obtained by the operation of the edit control device as an edited program file corresponding to the program file designated by the first designation information.

According to the code edit apparatus, similar advantages as those of the code edit program constituted by the first program and the second program can be obtained. The other technical concepts can also be applied to the code edit apparatus.

BRIEF DESCRIPTION OF THE DRAWINGS

Hereinafter, the present invention will be described as an example with reference to the attached drawings, in which:

FIGS. 3A, 3B, and 3C are explanatory diagrams related to a creation rule of the Rule file;

FIGS. 4A and 4B are explanatory diagrams related to an example of usage of JWeaver;

DETAILED DESCRIPTION OF THE PREFERRED EMBODIMENT

Figure 1A:
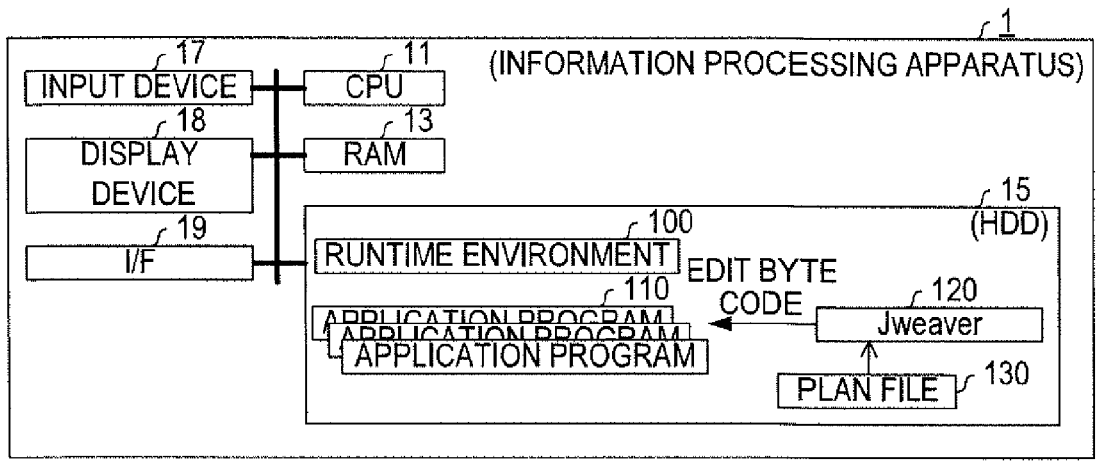
FIG. 1A is a block diagram showing a configuration of an information processing apparatus.

Although an information processing apparatus 1 of the present embodiment shown in FIG. 1A is constituted by hardware similar to that of a well-known information processing apparatus, the information processing apparatus 1 is characterized by JWeaver 120 that is a code edit program stored in a hard disk drive 15.

Simply describing a hardware configuration, the information processing apparatus 1 includes: a CPU 11; a RAM 13 used as a work area during execution of a program by the CPU 11; the hard disk drive 15 as a recording medium that records (stores) programs, etc. executed by the CPU 11 and that can be read by the CPU 11; an input device 17 constituted by a keyboard, a pointing device, etc.; a display device 18 constituted by a liquid crystal display, etc; and an interface 19 (for example, USB interface) that transfers data to and from an external apparatus.

The hard disk drive 15 stores a Java (registered trademark) runtime environment 100 that is a program executed by the CPU 11 and further stores application programs (Java (registered trademark) programs) 110 executed through the Java runtime environment 100. The hard disk drive 15 stores JWeaver 120 as one of the application programs 110.

Figure 1B:
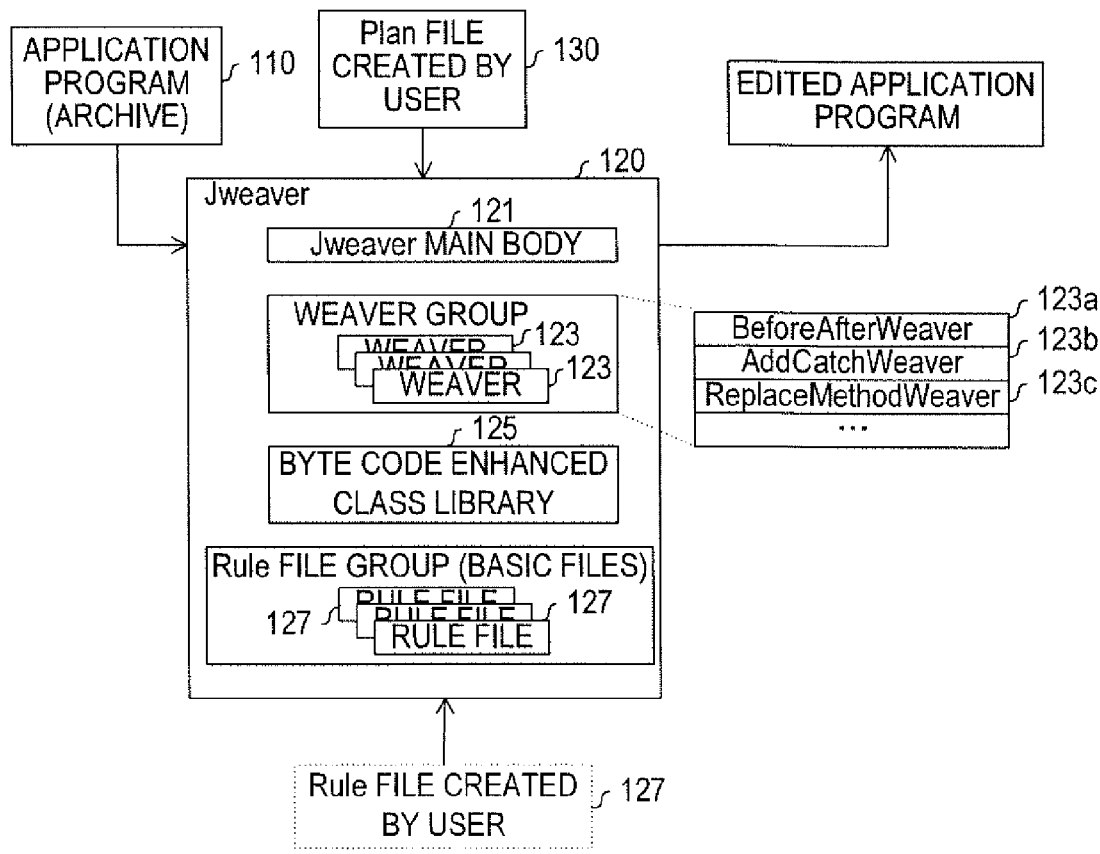
FIG. 1B is a diagram showing a configuration of JWeaver that is a code edit program recorded in a hard disk drive included in the information processing apparatus.

As shown in FIG. 1B, JWeaver 120 is constituted as an archive file including constituent elements: a JWeaver main body 121; a group of weavers 123; a byte code enhanced class library 125 as a class library for editing a byte code; and a group of Rule files 127 described below.

The JWeaver main body 121 is constituted by a class file group that realizes main functions of JWeaver 120 (described in detail later).

The weavers 123 are class files for performing a specific type of edit process to a byte code to be edited using the byte code enhanced class library 125. Although programs of the class files, etc. may be expressed as a subject below, the expression in which the programs serve as the subject means that the CPU 11 actually executes the programs to realize the corresponding processes.

The designer of JWeaver 120 creates the weavers 123 in advance, for each type of edit process, and stores the weavers 123 in JWeaver 120. However, the user can make and add the weavers 123 upon the use of JWeaver 120. A Java (registered trademark) development environment for compiling the source codes of the weavers 123 is required to make the weavers 123.

An example of a known byte code enhanced class library 125 includes javassist that is a library for handling a Java (registered trademark) byte code and that is known as a library capable of realizing byte code edit in the class file. Specifically, javassist provides a function of acquiring a byte code of a designated class and a function of translating a designated source code into a byte code to edit a designated class or method.

Figure 2A:
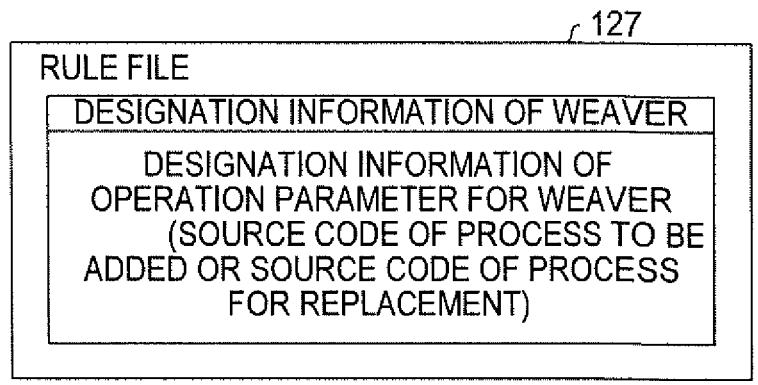
FIG. 2A is a schematic diagram of a Rule file.

The Rule files 127 are used during byte code edit, and as shown in FIG. 2A, the Rule files 127 are constituted as text files describing designation information of the weavers 123 used for the byte code edit and designation information of operation parameters for the weavers 123.

Specifically, the designation information of operation parameters includes source codes (additional codes) corresponding to byte codes newly added to byte codes to be edited, source codes (replacement codes) corresponding to byte codes that replace original byte codes in partial areas of the byte codes to be edited, etc. More specifically, the group of weavers 123 translates the source codes described in the Rule files 127, adds the byte codes to the byte codes to be edited, and replaces the partial areas of the byte codes to be edited by the byte codes. In this way, the byte codes to be edited are edited.

The user of JWeaver 120 basically creates the Rule files 127 by text files. However, a group of the Rule files 127 for realizing a basic edit process of byte codes is stored in advance in JWeaver 120 of the present embodiment. For example, a Rule file 127 (performance_log.jwr) for measuring the execution time of method shown at the lower part of FIG. 3A is stored in advance.

When activated, JWeaver 120 edits a byte code of a class file included in an archive file to be edited based on information set as arguments. The information set as arguments is designation information of a Plan file 130 to be referenced (described in detail later), designation information of archive files to be edited (application programs 110), and designation information of a destination for outputting the edited archive files. JWeaver 120 outputs the archive files storing the edited byte codes to the designated destination.

Figure 2B:
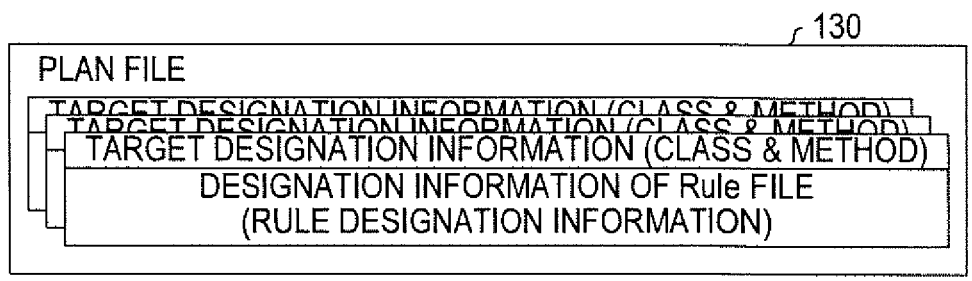
FIG. 2B is a schematic diagram of a Plan file.

As shown in FIG. 2B, the Plan file 130 is a text file describing target designation information for designating a method to be edited and rule designation information that is designation information of the Rule files 127 to be referenced upon the edit of the byte code of the method designated in the target designation information. The user who uses JWeaver 120 creates the Plan file 130 in a text file.

A creation rule of the Rule files 127 will be described, on the assumption that JWeaver 120 includes the following three weavers 123.

A first weaver 123a included in JWeaver 120 is a weaver for executing, as the edit process, a process of adding, to the byte code to be edited, a byte code causing the CPU 11 to execute a process corresponding to a first source code (Code: 1) described in the Rule files 127 before the execution of a process corresponding to a method to be edited and adding, to the byte code to be edited, a byte code causing the CPU 11 to execute a process corresponding to a second source code (Code: 2) described in the Rule files 127 after the execution of the process corresponding to the method to be edited. A class name "BeforeAfterWeaver" is provided to the weaver 123a in the present embodiment. Hereinafter, the weaver 123a will also be expressed as "BeforeAfterWeaver".

As described, the Rule files 127 include the designation information of the weavers 123 to be used. The designation information of the weavers 123 is described in the Rule files 127 following a label "#weaver" indicating that the subsequent description is the designation information of the weavers 123. Specifically, the designation information of the weavers 123 includes a class name of a designated weaver 123.

When information for designating the first weaver 123a (class name "BeforeAfterWeaver" of the weaver 123a) is described in the Rule file 127 as the designation information of the weavers 123, there is a rule that the designation information of the following operation parameters is written in the same Rule file 127.

Specifically, set values of operation parameters "var", "code:1", and "code:2" are described as the designation information of the operation parameters. When the set values of the operation parameters "var", "code:1", and "code:2" are described, corresponding labels "#var", "#code:1", and "#code:2" are described prior to the description of the set values.

The upper part of FIG. 3A shows roles of the operation parameters "var", "code:1", and "code:2" to be described together when the information for designating the first weaver 123a (class name "BeforeAfterWeaver" of the weaver 123a) is described as the designation information of the weavers 123.

As shown in FIG. 3A, the operation parameter "code:1" functions as an operation parameter indicating a source code corresponding to a process inserted at the top of the method. The operation parameter "code:2" functions as an operation parameter indicating a source code corresponding to a process inserted at the bottom of the method. Therefore, corresponding source codes are set to the operation parameters "coded" and "code:2".

The operation parameter "var" functions as an operation parameter for adding, at the top of the method, a process of declaring a local variable newly used in the source codes set to the operation parameters "code:1" and "code:2". Therefore a descriptive sentence for declaring the newly used local variable is set to the operation parameter "var".

The lower part of FIG. 3A is a diagram showing an example of description of the Rule file 127. The Rule file 127 shown at the lower part of FIG. 3A is a file for using "BeforeAfterWeaver" to add, to the top of the method, a process of declaring a local variable "now" that is set the current time and to add, to the bottom of the method, a process of calculating a difference between the time set to the variable "now" at the top of the method and the current time to display the calculated value. The use of the Rule file 127 allows the first weaver 123a to realize, as an edit process of a byte code for adding a new code to the method, a process of adding, to the method, a byte code for causing the CPU 11 to execute a process of measuring the execution time of a series of processes realized by the method before edit. A second weaver 123b included in JWeaver 120 and a creation rule of the Rule file 127 corresponding to the second weaver 123b will be described with reference to FIG. 3B.

The second weaver 123b is a weaver for executing, as the edit process, a process of inserting a try-catch block to the method to be edited and inserting an arbitrary code to a catch block. A class name "AddCatchWeaver" is provided to the weaver 123b.

When information for designating the second weaver 123b (class name "AddCatchWeaver" of the weaver 123b) is described in the Rule file 127 as the designation information of the weavers 123, there is a rule that the designation information of the following operation parameters is described in the same Rule file 127.

Specifically, set values of operation parameters "var", "code:1", and "exception" are described as the designation information of the operation parameters. FIG. 3B shows roles of the operation parameters "var", "code:1", and "exception" to be described together when the information for designating the second weaver 123b is described as the designation information of the weavers 123. As shown in FIG. 3B, the operation parameter "code:1" functions as an operation parameter indicating a source code inserted to the catch block, and the operation parameter "exception" functions as an operation parameter indicating an exception type to be caught. The operation parameter "var" denotes a newly used local variable.

A third weaver 123c included in JWeaver 120 and a creation rule of the Rule file 127 corresponding to the third weaver 123c will be described with reference to FIG. 3C.

The third weaver 123c is a weaver for executing, as the edit process, a process of replacing a method to be edited by a new method in a class including the method. A class name "ReplaceMethodWeaver" is provided to the weaver 123c.

When information for designating the third weaver 123c (class name "ReplaceMethodWeaver" of the weaver 123c) is described in the Rule file 127 as the designation information of the weavers 123, there is a rule that the designation information of the following operation parameters is described in the same Rule file 127.

Specifically, the set value of the operation parameter "coded." is described as the designation information of the operation parameters. FIG. 3C shows a role of the operation parameter "coded" to be described together when the information for designating the third weaver 123c is described as the designation information of the weavers 123. As shown in FIG. 3C, the operation parameter "code:1" defines the installation of a new method, and a source code of the newly installed method is described as the set value of the operation parameter "code:1".

A creation rule of the Plan file 130 and a step of using JWeaver 120 by use of the created Plan file 130 will be described with reference to FIG. 4A. FIG. 4A is an explanatory diagram related to the creation rule of the Plan file and the step of using JWeaver by use of the Plan file.

Specifically, FIG. 4A describes an example of creating the Plan file 130 when a code for measuring the execution time of a process for displaying a character string "Hello" as a debug code is inserted by applying the Rule file 127 shown at the lower part of FIG. 3A to a "sayHello ( )" method of a class of displaying the character string "Hello". FIG. 4A also describes a step of using JWeaver 120 by use of the Plan file 130.

As described, the Plan file 130 includes the target designation information and the rule designation information, and the target designation information includes information of the name of the class including the method to be edited and of the name of the method to be edited. The rule designation information includes information of the file name of the designated Rule file 127.

For example, if the class name of the class file to be edited is "Targetx", the method to be edited is a "sayHello( )" method of the "Targetx" class, and the file name of the Rule file 127 applied to the method is "performance_log.jwr", the target designation information and the rule designation information are described as a character string "*.Targetx#sayHell( )=performance_log.jwr" for the Plan file 130. By the way, "*" denotes the package name.

In this way, the target designation information and the rule designation information are connected by an equal sign to associate and describe the information in the present embodiment. Such a description can describe, in the Plan file 130, a plurality of pieces of target designation information and rule designation information corresponding to each piece of target designation information.

When a plurality of pieces of target designation information are described in the Plan file 130, the line is changed for each piece of the target designation information, and character strings corresponding to the target designation information and the rule designation information are described. For example, the Plan file 130 is created as shown in the following examples 1, 2, 3, and 4.

Example 1 of the Plan File 130:
***.Class1#method1( )=Rulefile1.jwr
***.Class1#method2( )=Rulefile2.jwr
Example 2 of the Plan File 130:
***.Class1#method1( )=Rulefile1.jwr
***.Class1#method1( )=Rulefile2.jwr
Example 3 of the Plan File 130:
***.Class1#method1( )=Rulefile1.jwr
***.Class1#method2( )=Rulefile1.jwr
Example 4 of the Plan File 130:
***.Class1#method1( )=Rulefile1.jwr
*.Class2#method2( )=Rulefile1.jwr The "example 2 of the Plan file 130" shows an example of description of the Plan file 130 when a plurality of Rule files 127 are applied to the same method. The "example 3 of the Plan file 130" shows an example of description of the Plan file 130 when the same Rule file 127 is applied to different methods. The "example 4 of the Plan file 130" shows an example of description of the Plan file 130 when the same Rule file 127** is applied to different methods of different classes.

For example, to insert a debug code for measuring the execution time to a plurality of methods in the class file to be edited, a Plan file 130 describing "performance_log.jwr" as rule designation information is created in accordance with the example 3. If the Plan file 130 is created this way, the debug code for execution time measurement can be inserted to each of the plurality of methods by one execution of JWeaver 120.

To insert a debug code for measuring the execution time to each of the methods included in a plurality of class files stored in the archive files to be edited (application programs 110), a Plan file 130 describing "performance_log.jwr" as rule designation information is created in accordance with the example 4. This allows inserting the debug code for execution time measurement to each method included in a plurality of class files in the archive files by executing JWeaver 120 once.

The Plan file 130 is created by such a rule. After the creation of the Plan file 130, the user activates JWeaver 120 through a console as shown at the lower part of FIG. 4A.

Specifically, the user sets, as arguments, the designation information of the Plan file 130, the designation information of the archive files (i.e. application programs 110) storing the class files to be edited, and the designation information of the destination of the edited archive files and activates JWeaver 120. The designation information set to the arguments can be expressed by path names and file names of the corresponding data files.

When the arguments are set and JWeaver 120 is activated via the console, JWeaver 120 reads the Plan files 130 set as the arguments line by line and applies an edit process to the methods indicated by the target designation information of the lines based on the weavers 123 designated in the Rule files 127 indicated by the rule designation information of the same lines. Specifically, JWeaver 120 executes an edit process according to the set values of the operation parameters indicated by the Rule files 127.

JWeaver 120 then creates class files storing the edited byte codes to create new archive files storing the created class files in place of the original class files and outputs the archive files to the designated destination.

FIG. 4B is an explanatory diagram showing an execution result of a class file before and after applying the Rule file 127 shown at the lower part of FIG. 3A to the class file shown at the upper part of FIG. 4A to edit the byte code. The upper part of FIG. 4B is a diagram showing output of a class file before the byte code edit, and the lower part of FIG. 4B is a diagram showing output of the class file after the byte code edit. In this way, the byte code can be easily edited using JWeaver 120. One of the features of JWeaver 120 is that a source code corresponding to the class file to be edited is not required in the byte code edit. The source code described in the Rule file 127 is compiled based on a function of the byte code enhanced class library 125 and written in the byte code to be edited.

Figure 5:
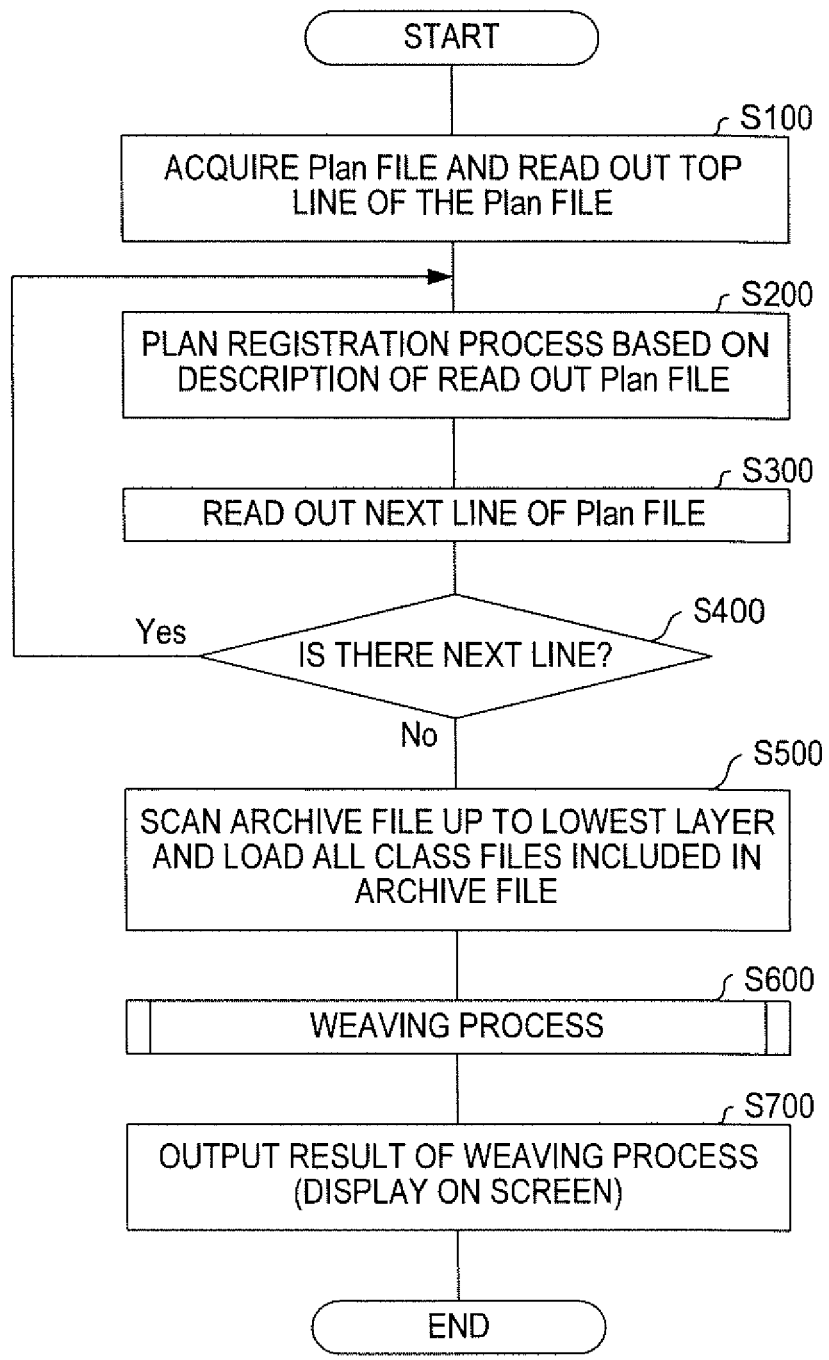
FIG. 5 is a flow chart showing a process realized by JWeaver.

Details of the process executed by JWeaver 120 will be described with reference to the drawings after FIG. 5. FIG. 5 is a flow chart showing a process that is realized by a class file group constituting the JWeaver main body 121 and that is executed when JWeaver 120 is activated via the console.

When JWeaver 120 is activated, the CPU 11 acquires the Plan file 130 designated by an argument and reads the top line of the Plan file 130 to acquire the target designation information and the rule designation information described in the top line (S100). The CPU 11 then executes a plan registration process shown in FIG. 6 based on the acquired target designation information and the rule designation information (S200).

Specifically, the CPU 11 generates an instance of a Rule class (hereinafter, expressed as a "Rule instance") holding the content of description of the Rule file 127 designated by the rule designation information and generates an instance of a Plan class (hereinafter, expressed as a "Plan instance") holding the target designation information. The CPU 11 registers the corresponding Rule instance to the Plan instance. In this way, the target designation information, the weaver 123 used in the byte code edit in the method indicated by the target designation information, and the set values of the operation parameters for the weaver 123 are associated. The "plan registration" herein denotes generation and association of the Plan instance and the Rule instance.

Figure 6:
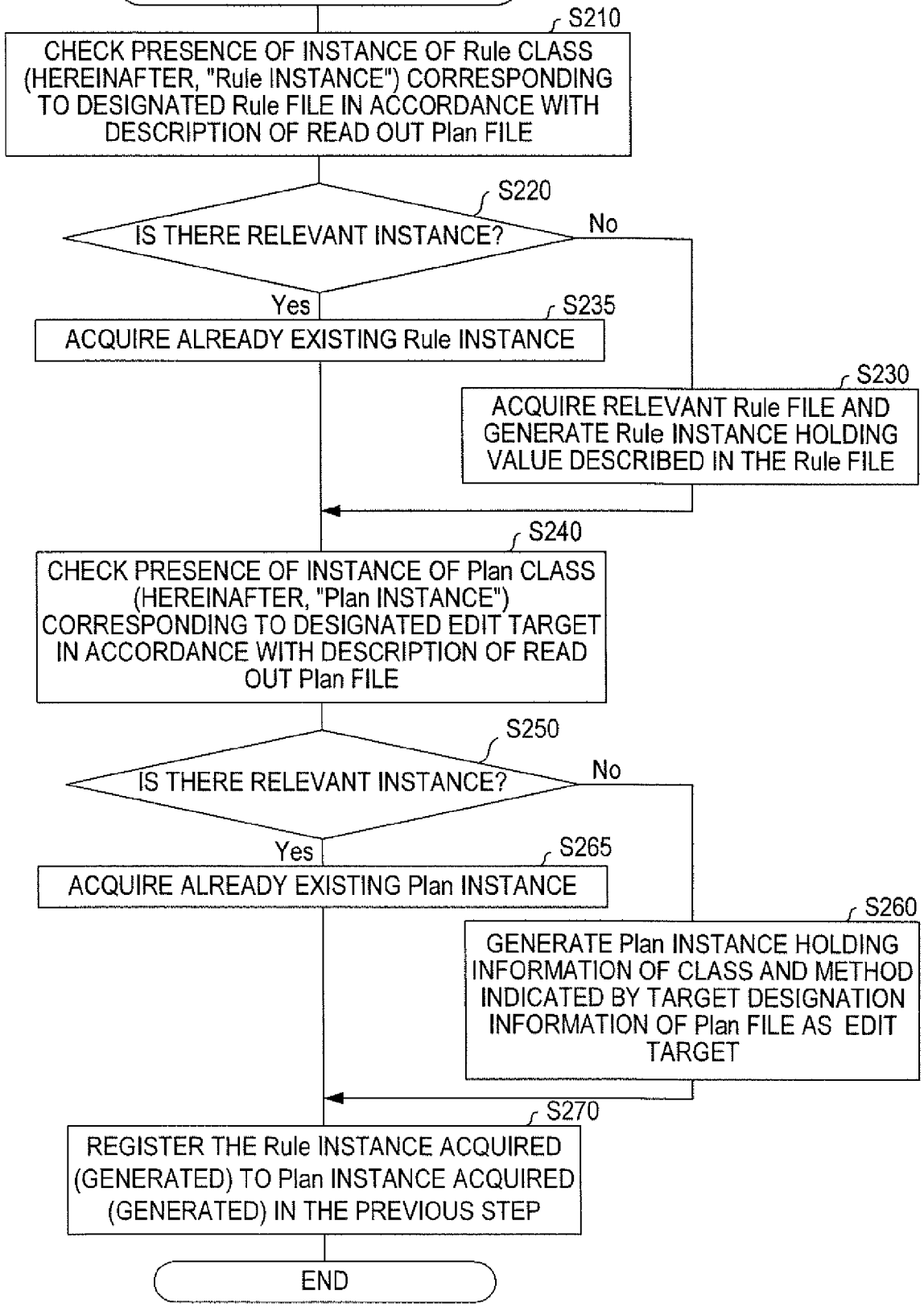
FIG. 6 is a flow chart showing a plan registration process.

FIG. 6 is a flow chart showing a plan registration process executed by the CPU 11. When the plan registration process is started in S200, the CPU 11 checks whether a Rule instance corresponding to the Rule file 127 designated by the rule designation information already exists, based on the rule designation information among the target designation information and the rule designation information acquired in S100 (S210). The Rule instance holds the corresponding file name of the Rule file 127 as a value. Therefore, the CPU 11 checks whether the Rule instance corresponding to the Rule file 127 designated by the rule designation information already exists based on the file names of the Rule files 127 held by already existing Rule instances.

If the CPU 11 determines that there is no relevant Rule instance (No in S220), the CPU 11 acquires the Rule file 127 designated by the rule designation information to read out the description of the Rule file 127 and generates a Rule instance holding the designation information of the weaver 123 described in the Rule file 127 and the designation information of the operation parameters (S230). Although the Rule class is a class for holding the content of description of the Rule file 127, as described, the Rule class also holds the corresponding file name of the Rule file 127.

On the other hand, if the CPU 11 determines that there is a corresponding Rule instance (Yes in S220), the CPU 11 acquires the Rule instance corresponding to the Rule file 127 designated by the rule designation information (S235).

After the generation or the acquisition of the Rule instance, the CPU 11 checks whether there is a Plan instance holding edit target information that is the same as the target designation information acquired in S100 (S240).

If there is no corresponding Plan instance (No in S250), the CPU 11 generates a Plan instance holding the target designation information, or information of class and method to be edited (S260). As described, the Plan class is a class for holding information of the class and the method to be edited constituting the target designation information.

On the other hand, if there is a corresponding Plan instance (Yes in S250), the CPU 11 acquires a Plan instance holding the edit target information that is the same as the target designation information acquired in S100 (S265).

The CPU 11 then registers the Rule instance generated in S230 or acquired in S235 to the Plan instance generated in S260 or acquired in S265 to associate the Plan instance and the Rule instance (S270). The plan registration process is then completed.

When the plan registration process is completed, the CPU 11 reads out the next line of the Plan file 130 (S300). If there is a next line (Yes in S400), the CPU 11 applies the process of S200 to the read out next line to generate and associate the Plan instance and the Rule instance based on the target designation information and the rule designation information described in the line.

On the other hand, if there is no next line (No in S400), the CPU 11 determines that all target designation information and the rule designation information described in the Plan file 130 are read out, and the process moves to S500. In S500, the CPU 11 scans, up to the lowest layer, archive files to be edited that are set as the arguments at the activation of JWeaver 120 and loads all class files included in the archive files to the memory (RAM 13).

Figure 7:
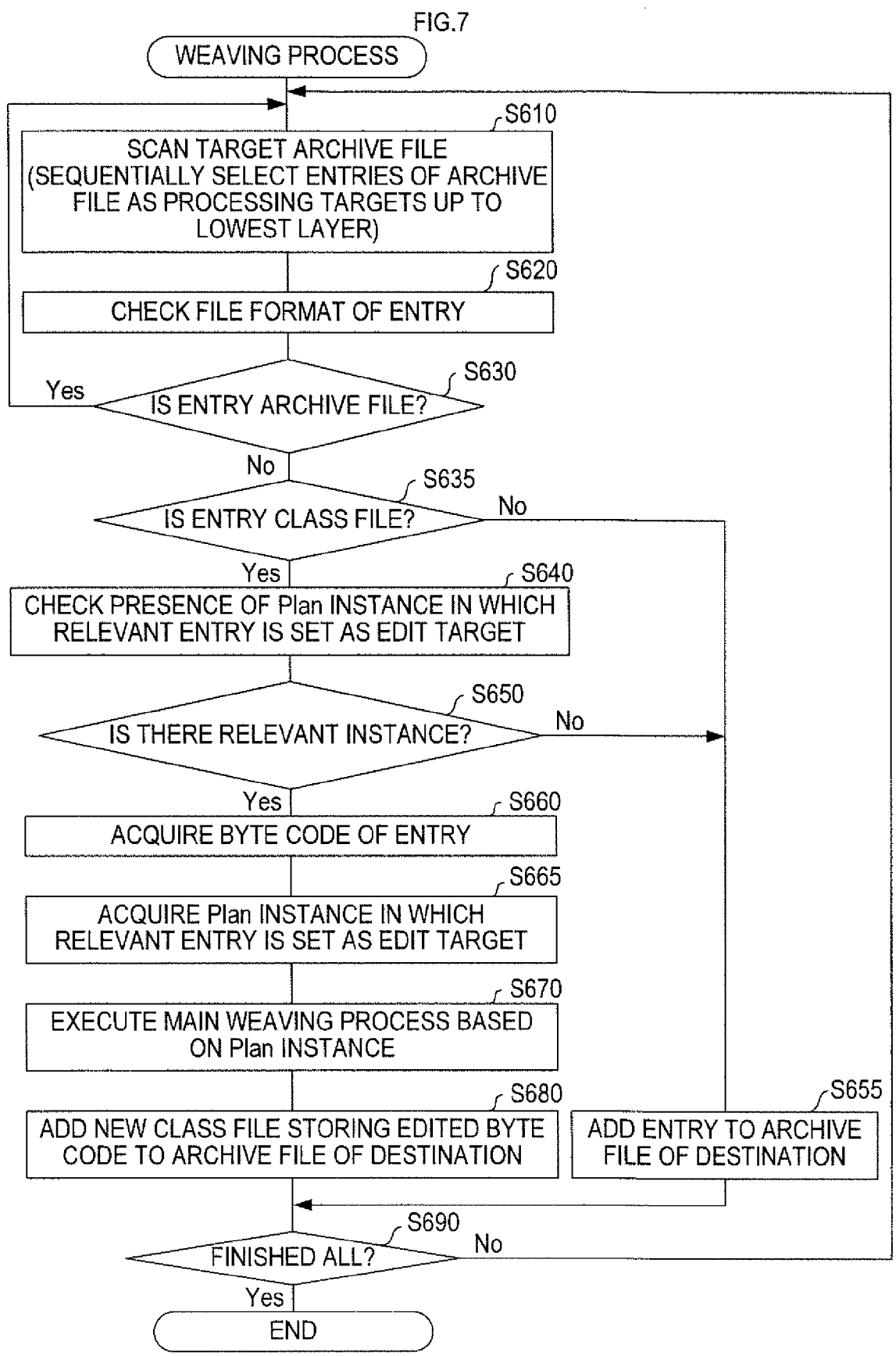
FIG. 7 is a flow chart showing a weaving process.

When the process is finished, the process moves to S600, and the CPU 11 executes a weaving process. FIG. 7 is a flow chart showing the weaving process executed by the CPU 11.

When the weaving process is started, the CPU 11 selects one of the entries in the archive files to be edited as a processing target (S610) and checks a file format of the entry selected as the processing target (S620). Entries are files stored in the archive files.

If the CPU 11 determines that the processing target entry is an archive file in an ear format, a war format, a jar format, etc. (Yes in S630), the process moves to S610. The CPU 11 refers to the archive file corresponding to the entry and selects an entry in the archive file of a lower layer as a new processing target. Therefore, in S610 to S630, the CPU 11 scans the archive files to be edited up to the lower layers and sequentially selects the entries as processing targets. In S610, after selecting all entries in the archive files of lower layers as processing targets, the CPU 11 selects one of the entries that are in upper layers and that are not selected as processing targets as a processing target.

On the other hand, if the CPU 11 determines that the processing target entry is not an archive file in S630 (No in S630), the CPU 11 moves to S640 and determines whether the processing target entry is a class file.

If the CPU 11 determines that the processing target entry is not a class file (No in S635), the CPU 11 adds the entry to the archive file of the destination set as the argument upon the activation of JWeaver 120 (S655). As described, in the present embodiment archive file to be edited have a tree structure including archive files in lower layers. Therefore, in S655, the CPU 11 registers the entries in the archive files of the destination so as to keep the tree structure of the archive files to be edited.

After the process of S655, the CPU 11 moves to S690 and determines whether all entries up to the lowest layer that are registered in the archive files to be edited are selected as the processing targets. If there is an entry not selected as the processing target, the CPU 11 moves to S610 and ends the weaving process when there is no more entry not selected as the processing target.

On the other hand, if the CPU 11 determines that the processing target entry is a class file in S635 (Yes in S635), the process moves to S640, and the CPU 11 checks the presence of a Plan instance holding the information of class file to be edited corresponding to the processing target entry as edit target information.

If there is no corresponding Plan instance (No in S650), the process moves to S655, and the CPU 11 adds the processing target entry to the archive file of the destination. The process then moves to S690.

If there is a corresponding Plan instance (Yes S650), the CPU 11 handles that the processing target entry is a class file to be edited, acquires a byte code of the class corresponding to the entry (S660), acquires the Plan instance holding information of the processing target entry as the class file to be edited (S665), and executes an main weaving process based on the Plan instance (S670).

Figure 8:
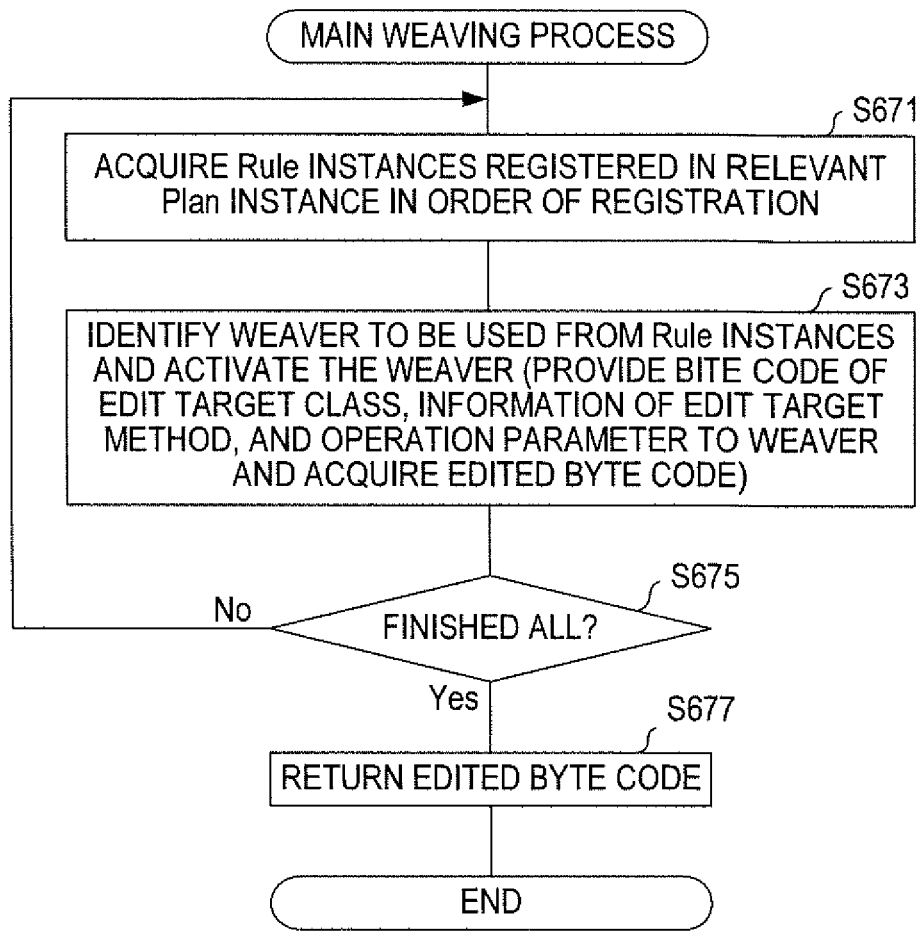
FIG. 8 is a flow chart showing a main weaving process.

FIG. 8 is a flow chart showing the main weaving process executed by the CPU 11. When the main weaving process is started, the CPU 11 acquires one of the Rule instances registered in the Plan instances acquired in S665 (S671). However, the CPU 11 acquires the Rule instances in S671 in the order of registration to the Plan files.

The CPU 11 then activates the corresponding weaver 123 based on the designation information of the weaver 123 held in the acquired Rule instance (S673). The byte code of the edit target class, the designation information of the edit target method, and the set values of the operation parameters held in the Rule instance are provided to the weaver 123.

As a result, the CPU 11 sets the area corresponding to the method to be edited in the class file to be edited as the byte code to be edited and causes the weaver 123 to execute a specific type of edit process according to the provided set values of the operation parameters to acquire the edited byte code (in detail, the edited byte code corresponding to the class file to be edited). Specifically, the CPU 11 executes the process corresponding to the weaver 123 via the byte code enhanced class library 125 to edit the corresponding byte code of the class file. Although the flow chart of the weaver 123 is not illustrated, it can be programmed such that the weaver 123 executes the edit process of byte code via a well-known byte code enhanced class library 125 based on the information provided from the outside.

When the process is finished, the CPU 11 determines whether the processes of S671 and S673 are applied to all Rule instances registered in the Plan instances (S675). If all the processes are not executed (No in S675), the process moves to S671, and the CPU 11 acquires the next Rule instance (S671).

In S673, the CPU 11 activates the relevant weaver 123 based on the designation information of the weaver 123 held by the Rule instance and causes the weaver 123 to execute a specific type of edit process according to the set values of the operation parameters indicated by the Rule instance. In this case, the edited byte code acquired in S673 is provided to the weaver 123. The weaver 123 applies the edit process to the edited byte code acquired in S673. If a plurality of Rule instances are registered in Plan instances corresponding to a single class file to be edit, byte codes of the class file are edited by cumulatively reflecting the edit results of the byte codes based on the Rule instances.

On the other hand, if the CPU 11 determines that the processes of S671 and S673 are applied to all Rule instances registered in the Plan instances (Yes in S675), the CPU 11 passes, as the execution result of the main weaving process, the ultimately generated byte codes after edit to the weaving process shown in FIG. 7 (S677).

In this way, the CPU 11 executes the main weaving process in S670, and when the process is finished, the process moves to S680. The CPU 11 generates a new class file storing the edited byte codes as the execution result of the main weaving process obtained in the process of S670 and adds the class file to the archive files of the destination (S680). The process then moves to S690, and the CPU 11 determines whether all entries up to the lowest layer that are registered in the archive files to be edited are selected as the processing targets. If not all entries are selected as the processing targets, the process moves to S610. If all entries are selected as the processing targets and the process after S620 is executed, the CPU 11 makes an affirmative determination in S690 and ends the weaving process.

When the weaving process is finished, the result of the weaving process is displayed to the screen (S700), and a series of processes of JWeaver 120 is completed.

Although the embodiment of the present invention has been described, according to the present embodiment, the weavers 123 that can apply a specific type of edit to byte codes is provided for each type of edit process, and JWeaver 120 as a code edit program is configured to be able to set, to the weavers 123, operation parameters for determining details of the edit.

If JWeaver 120 is used, the user can edit a class file with a high degree of freedom just by selecting operation parameters and weavers, writing the designation information in the Rule files 127, and writing the information to be edited in the Plan file 130 along with the designation information of the Rule files 127. According to the present embodiment, the user can directly edit the class files as binary codes through the weavers 123. Therefore, the user can edit the class files to be edited without source codes corresponding to the class files to be edited.

Particularly, according to JWeaver 120, the source codes can be described in the Rule files 127 as operation parameters to input arbitrary codes (such as debug codes) to the class files to be edited.

As a result, according to the present embodiment, a highly convenient tool (JWeaver 120) that does not require the user to edit the source code corresponding to the class file and that can edit the class file with a higher degree of freedom than in the past can be provided.

The present embodiment adopts a method of describing the edit target information, the designation information of the weavers 123, and the designation information of the operation parameters separately into the Plan file 130 and the Rule files 127. Therefore, the Rule files 127 can be constituted as general-purpose data files not limited to specific edit targets. Therefore, the present embodiment is significantly convenient that the Rule file 127 does not have to be created every time a debug target class file requiring byte code edit is generated.

Particularly, if a Rule file 127 for adding a process of measuring the execution time of the method as shown at the lower part of FIG. 3A is set in advance in the archive file of JWeaver 120, it is significantly convenient that the user does not have to create the Rule file 127 for measuring the execution time of the method during the debug operation and that the process of measuring the execution time of the method can be easily included in the debug target class file.

The weaver 123 included in JWeaver 120 corresponds to an example of a first program of the present invention, and a hardware configuration for realizing a process based on the weaver 123 corresponds to an example of a code edit device. The process of acquiring the Plan file 130 and the Rule files 127 corresponds to an example of a file acquisition step of the present invention, and a hardware configuration for realizing the process corresponds to an example of a file acquisition device.

The information for designating a class file to be edited as a program file to be edited that is information described in the Plan file 130 and for designating a specific method in the class file as an edit target area corresponds to an example of first designation information of the present invention. The information described in the Rule file 127 corresponds to an example of second designation information and third designation information of the present invention.

The process of S660 corresponds to an example of a code acquisition step, and a hardware configuration for realizing the process corresponds to an example of a code acquisition device. The process of S673 corresponds to an example of an edit control step, and a hardware configuration for realizing the process corresponds to an example of an edit control device. The process of S680 corresponds to an example of an edited file output step, and a hardware configuration for realizing the process corresponds to an example of an edited file output device.

The first weaver 123a (BeforeAfterWeaver) corresponds to an example of a before/after addition program in the present invention, and the Rule file 127 shown at the lower part of FIG. 3A corresponds to an example of an "edit rule description file describing a source code for causing a computer to execute a process of measuring the execution time".

The present invention is not limited to the embodiment, and various modifications can be employed. For example, an example of applying the concept of the present invention to the application programs 110 of Java (registered trademark) has been illustrated in the embodiment, the present invention is not limited to programming languages.

JWeaver 120 can include a weaver 123 that executes a process of deleting the byte code of an edit target method from the byte code of the edit target class to edit the byte code of the edit target class so that the process corresponding to the edit target method is not executed. When the weaver 123 is used, only information for designating the weaver 123 can be described in the Rule files 127 as the designation information of the weaver 123 to be used to edit the byte code, and the designation information of the operation parameters does not have to be described.

What is claimed is:

1. A non-transitory computer-readable recording medium having computer-executable instructions stored thereon that, when executed, cause a computer to perform steps, the computer-readable recording medium comprising:
   first programs; and
   a second program,
      each of the first programs causing the computer to execute a step of performing each specific type of edit process to a binary code to be edited, each of the first programs being recorded for each type of edit process, and
      the second program causing the computer to execute:
         a file acquisition step of one of
            acquiring a single file describing first designation information, which is information for designating a program file including the binary code to be edited and an edit target area in the program file, and second designation information, which is information for designating one specific program to be used among the first programs, and
            acquiring a file group in which the first designation information and the second designation information are dispersed and described;
         a code acquisition step of acquiring the binary code of the program file designated by the first designation information described in the single file or the file group acquired in the file acquisition step;
         an edit control step of causing the computer to execute the specific type of edit process based on the one specific program designated by the second designation information described in the single file or the file group acquired in the file acquisition step, a binary code in the edit target area indicated by the first designation information of the binary code acquired in the code acquisition step being the binary code to be edited; and
         an edited file output step of outputting a program file storing the binary code edited in the edit control step as an edited program file corresponding to the program file designated by the first designation information.

2. The non-transitory recording medium according to claim 1, wherein one of the first programs includes one of:
   a program causing the computer to execute a process of adding a new binary code to the binary code to be edited;
   a program causing the computer to execute a process of replacing at least part of the binary code to be edited by another binary code; and
   a program causing the computer to execute a process of deleting at least part of the binary code to be edited from the binary code acquired in the code acquisition step.

3. The non-transitory recording medium according to claim 1, wherein
   each of the first programs is a program causing the computer to execute a step of performing a specific type of edit process according to a set value of an operation parameter to a binary code to be edited, the program being recorded for each type of edit process;
   the file acquisition step is a step of acquiring a single file describing the first designation information, the second designation information, and third designation information indicating the set value of the operation parameter for the one specific program or acquiring a file group in which the first designation information, the second designation information, and the third designation information are dispersed and described; and
   the edit control step is a step of causing the computer to execute the specific type of edit process that is based on the one specific program designated by the second designation information and that is in accordance with the set value of the operation parameter indicated by the third designation information in accordance with the first designation information, the second designation information, and the third designation information described in the single file or the file group acquired in the file acquisition step, a binary code in the edit target area indicated by the first designation information of the binary code acquired in the code acquisition step being the binary code to be edited.

4. The non-transitory recording medium according to claim 3, wherein one of the first programs includes one of:
   a program causing the computer to execute a process of translating a source code indicated by the set value of the operation parameter into a binary code and adding the binary code to the binary code to be edited; and
   a program causing the computer to execute a process of translating the source code indicated by the set value of the operation parameter into a binary code and replacing at least part of the binary code to be edited by the converted binary code.

5. The non-transitory recording medium according to claim 3, wherein the file acquisition step includes:
   a step of acquiring a target description file, which is a data file describing, along with the first designation information, designation information of an edit rule description file that is a data file describing the second designation information and the third designation information; and
   a step of acquiring the edit rule description file designated by the target description file after the acquisition of the target description file.

6. The non-transitory recording medium according to claim 3, wherein one of the first programs include:
   a program causing the computer to execute a process of adding, to the binary code to be edited, a binary code causing the computer to execute a process corresponding to the source code indicated by the set value of the operation parameter before and after the execution of the series of processes realized by the binary code.

7. The non-transitory recording medium according to claim 5, recording, as one of the first programs,
   a before/after addition program that is a program causing the computer to execute a process of adding the binary code causing the computer to execute, to the binary code to be edited, a process corresponding to the source code indicated by the set value of the operation parameter before and after the execution of the series of processes realized by the binary code, and further recording,
   the edit rule description file describing, as the second designation information, information for designating the before/after addition program, and describing, as the third designation information, a source code causing the computer to execute a process of measuring the execution time of a series of processes before and after the execution of the series of processes realized by the binary code to be edited.

8. A code edit apparatus comprising:
   one or more processors that execute one or more programs to enable devices including:

code edit devices, each of which performs a specific type of edit process to a binary code to be edited, each of the code edit devices being provided for each type of edit process;

a file acquisition device that acquires a single file describing first designation information, which is information for designating a program file including the binary code to be edited and an edit target area in the program file, and second designation information, which is information for designating one specific device to be activated among the code edit devices, or that acquires a file group in which the first designation information and the second designation information are dispersed and described;

a code acquisition device that acquires the binary code of the program file designated by the first designation information described in the single file or the file group acquired in the file acquisition step;

an edit control device that activates the one specific device designated by the second designation information described in the single file or the file group acquired by the file acquisition device and that causes the one specific device to execute the specific type of edit process, a binary code in the edit target area indicated by the first designation information of the binary code acquired by the code acquisition device being the binary code to be edited; and an edited file output device that outputs a program file storing the edited binary code obtained by the operation of the edit control device as an edited program file corresponding to the program file designated by the first designation information.

9. The code edit apparatus according to claim 8, wherein one of the code edit devices includes one of:
a device that adds a new binary code to the binary code to be edited;
a device that replaces at least part of the binary code to be edited by another binary code; and
a device that deletes at least part of the binary code to be edited from the binary code acquired by the code acquisition device.

10. The code edit apparatus according to claim 8, wherein each of the code edit devices includes:
a device that executes a specific type of edit process according to a set value of an operation parameter to a binary code to be edited, wherein
the file acquisition device acquires a single file describing the first designation information, the second designation information, and third designation information indicating the set value of the operation parameter for the one specific device or acquires a file group in which the first designation information, the second designation information, and the third designation information are dispersed and described,
the code acquisition device acquires the binary code of the program file designated by the first designation information described in the single file or the file group acquired by the file acquisition device, and
the edit control device activates the one specific device designated by the second designation information described in the single file or the file group acquired by the file acquisition device to cause the one specific device to execute the specific type of edit process in accordance with the set value of the operation parameter indicated by the third designation information, a binary code in the edit target area indicated by the first designation information of the binary code acquired by the code acquisition device being the binary code to be edited.

11. The code edit apparatus according to claim 10, wherein one of the code edit devices includes one of:
a device that translates a source code indicated by the set value of the operation parameter into a binary code and that adds the binary code to the binary code to be edited; and
a device that translates the source code indicated by the set value of the operation parameter into a binary code and that replaces at least part of the binary code to be edited by the converted binary code.

12. The code edit apparatus according to claim 10, wherein the file acquisition device is a device that
acquires a target description file, which is a data file describing, along with the first designation information, designation information of an edit rule description file that is a data file describing the second designation information and the third designation information and that
acquires the edit rule description file designated by the target description file after the acquisition of the target description file.

13. The code edit apparatus according to claim 10, wherein one of the code edit devices include:
a device that adds, to the binary code to be edited, a binary code causing the computer to execute a process corresponding to the source code indicated by the set value of the operation parameter before and after the execution of the series of processes realized by the binary code in accordance with the source code indicated by the set value of the operation parameter.

14. The code edit apparatus according to claim 12, wherein one of the code edit devices include:
a before/after addition device that adds, to the binary code to be edited, a binary code causing the computer to execute a process corresponding to the source code indicated by the set value of the operation parameter before and after the execution of the series of processes realized by the binary code in accordance with the source code indicated by the set value of the operation parameter, the code edit apparatus further recording
the edit rule description file describing, as the second designation information, information for designating the before/after addition device, and describing, as the third designation information, a source code causing the computer to execute a process of measuring the execution time of a series of processes before and after the execution of the series of processes realized by the binary code to be edited.

* * * * *